United States Patent [19]
Davis et al.

[11] Patent Number: 6,072,524
[45] Date of Patent: Jun. 6, 2000

[54] ELECTRONIC OBSERVATION POST WITH COMMUNICATIONS RELAY

[75] Inventors: John E. Davis, Claremont; Veron R. Creekmore, Chino Hills, both of Calif.

[73] Assignee: The Boeing Company, Seal Beach, Calif.

[21] Appl. No.: 08/835,368

[22] Filed: Apr. 7, 1997

[51] Int. Cl.$^7$ ...................................................... H04N 7/18
[52] U.S. Cl. .............................. 348/164; 348/144; 348/35
[58] Field of Search ..................................... 348/164, 144, 348/35

[56] References Cited

U.S. PATENT DOCUMENTS

| | | |
|---|---|---|
| 3,742,358 | 6/1973 | Cesaro . |
| 3,962,537 | 6/1976 | Kearns et al. . |
| 4,533,945 | 8/1985 | Lauvray et al. . |
| 4,908,705 | 3/1990 | Wight . |
| 5,534,697 | 7/1996 | Creekmore et al. . |
| 5,596,494 | 1/1997 | Kuo . |
| 5,628,033 | 5/1997 | Dilich et al. . |
| 5,672,820 | 9/1997 | Rossi et al. . |
| 5,899,945 | 5/1999 | Baylocq et al. . |

*Primary Examiner*—Andy Rao
*Attorney, Agent, or Firm*—Stout, Uxa, Buyan & Mullins, LLP

[57] ABSTRACT

This invention relates to an apparatus for observing objects and determining their position. A SIRPS (Staring Infrared Panoramic Sensor) for observing objects in a 360° field of view around the SIRPS is coupled with a GPS (global positioning system) to give position data for the objects observed by the SIRPS, an IMU (inertial measurement unit) which provides data on the attitude of the SIRPS and a transmitter to transmit the view of the objects and the position data to a user having a display showing him the objects and positions of the objects. The SIRPS, IMU, GPS and transmitter/receiver are combined in a pod which is placed in a position where it can have a large field of view such as by being flown over the area to be observed such as under a modified Rogollo wing tethered to the ground to hold it in position. A repeater will allow two way communications through the device which is in the air such that radio communications over barriers, such as hills, is enabled. A user receives the SIRPS images and displays them for viewing such that the user can then see objects and know their positions.

15 Claims, 2 Drawing Sheets

6,072,524

ELECTRONIC OBSERVATION POST WITH COMMUNICATIONS RELAY

BACKGROUND OF THE INVENTION

1. Field of the Invention

This invention relates to a portable observing post and communication relay, and more particularly to a pod containing a GPS position sensor, a communication relay system, observation apparatus, and an inertial measuring unit, which may be suspended from a flying device, to provide users with observation and position data for objects in the field of view of the observation apparatus and two-way communications facilitation between a command post and persons in the field.

2. Description of the Related Art

In the past people have used scanning type devices which were fixed in position on poles at low altitudes. These devices were often placed too low to enable efficient communications, had a lesser capability to determine the location of observed objects, and had too little sensitivity to detect vehicles or terrain, or to distinguish those from the background.

SUMMARY OF THE INVENTION

The invention relates to a pod having a SIRPS (Staring Infrared Panoramic Sensor) observation capability to observe the existence of a fire, its intensity, size and movement, a GPS (Global Positioning System) positioning capability to provide data as to the location of the fire and the location of fire fighting personnel and equipment, an inertial measurement unit to determine the orientation of the pod so that position data on the fire will be accurately coordinated, and a radio repeater for communications by radio to persons in the field with a command post, and for communications of the SIRPS data and position data to the command post.

The pod is suspended from a flying device such as a balloon, kite or modified Rogollo wing which is tethered to the ground and which receives power from the ground to operate the electronics in the pod.

The firefighters can carry the pod and flying device to an area such as a ridge line over a canyon and launch the pod on the flying device so that it is airborne in a relatively fixed position tethered to the ground. The pod has a SIRPS unit for observing the fire and where equipment and people are, as well as what the terrain is and where roads and other features are. The pod also has an inertial measurement unit for determining the attitude of the pod so that it can provide information on the absolute position of things it sees. The pod contains a GPS receiver for receiving satellite data as to its position, and a radio repeater for facilitating two way communications between fire fighters in the field and the command post.

The communications terminal and operations relay is deployed upwind of a fire and acts as a communications link for people in the field to the command post. It also provides position, movement, and fire intensity information to the command post. With this information the command post can position men and equipment so as to best and most safely fight the fire.

OBJECTS OF THE INVENTION

It is an object of the invention to provide a panoramic sensor for observing a fire scene.

It is a further object of the invention to provide data on the location of the fire.

It is a further object of the invention to provide intensity data about the fire.

It is a further object of the invention to detect changes in the fire status.

It is a further object of the invention to provide movement data about the fire.

It is a further object of the invention to provide an instant relay for two-way communications between fire fighters, and between the command post and the fire fighters.

It is also an object of the invention to provide a locator specifying locations of people and objects in GPS coordinates.

Other objects, advantages and novel features of the present invention will become apparent from the following detailed description of the invention when considered in conjunction with the accompanying drawings.

DETAILED DESCRIPTION OF THE PREFERRED EMBODIMENT

Although almost any objects may be observed and tracked using this device, the invention will be described for use in fighting forest fires in remote or inaccessible terrain. It should be noted that the same equipment can be used by soldiers on a battlefield, lifeguards, border patrol agents, the coast guard, or any of many potential users for observing, positioning and tracking people or other objects.

Figure 1:
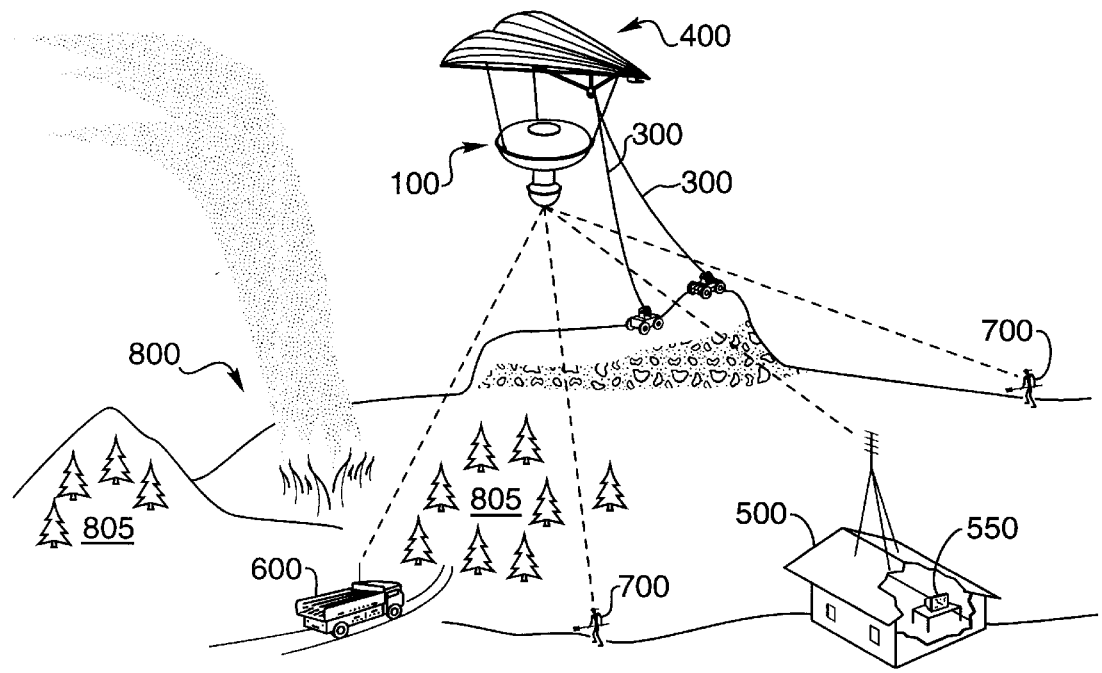
FIG. 1 is a perspective view of the field.

FIG. 1 shows the terrain in which the invention operates. It also shows a flying device 400 in the shape of a Rogollo wing. The flying device 400 is deployed and secured to the ground by tethers 300. A forest fire 800 is burning in a forest 805.

Figure 2:
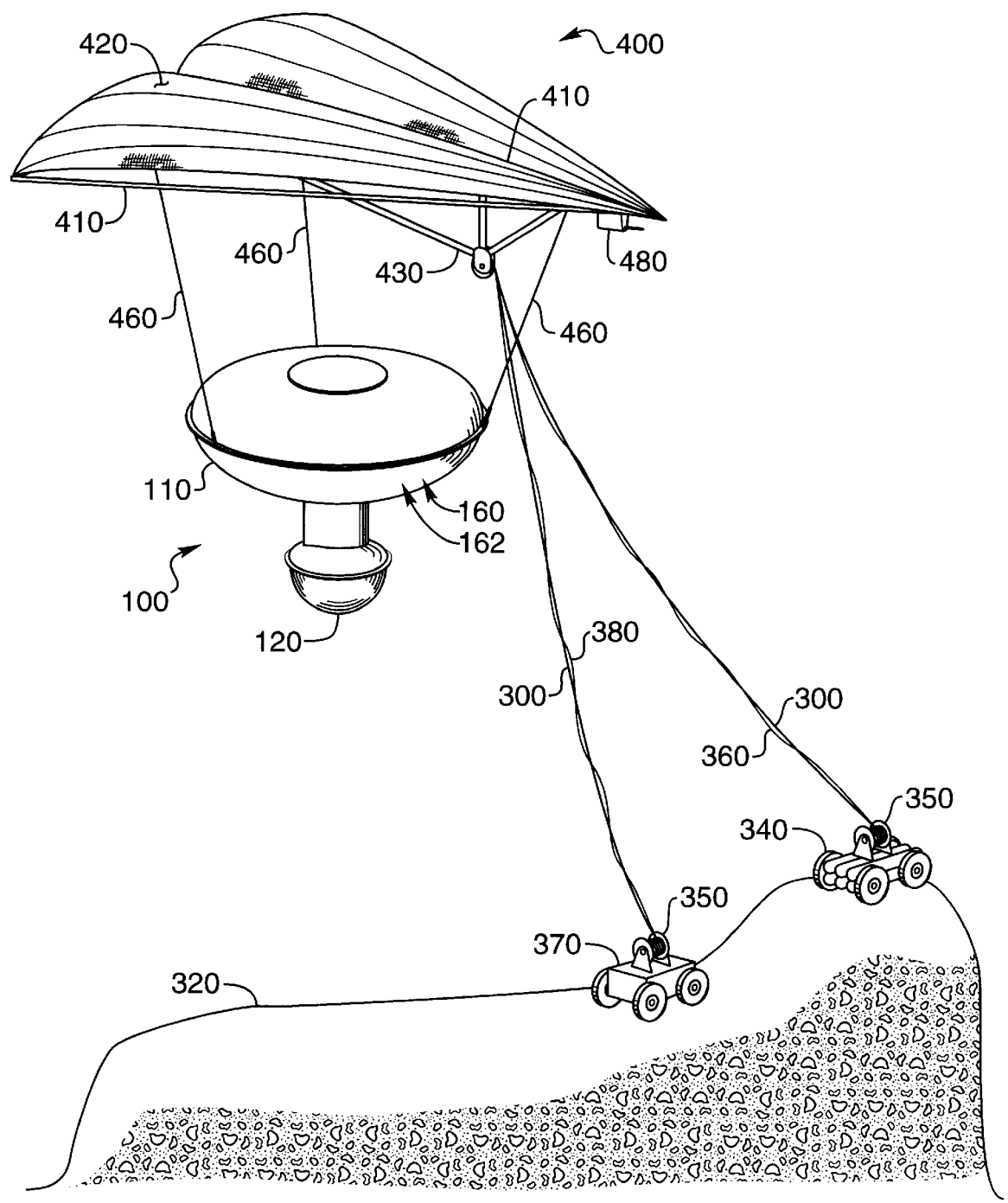
FIG. 2 shows a view of the pod in a rigged position on a Rogollo wing tethered to the ground.

Referring to FIG. 2, a pod 100 is supported by the flying device 400. The pod 100 contains a SIRPS (Staring Infrared Panoramic Sensor), comprising SIRPS electronics 180 (FIG. 3) in housing 110 and SIRPS optics 120, for observing the terrain, the fire 800, the fire fighting equipment 600 and the firefighters 700. Information about the fire scene and fire fighting resources is transmitted from the pod 100 to a command post 500 where it is displayed on display 550. The command post 500 uses data from a GPS (Global Positioning System) receiver 170 in the pod 100 for obtaining position data relating to objects observed by the SIRPS. The communications equipment in the pod 100 can be used to dispatch firefighters 700 and fire fighting equipment 600 to the fire, transmit information about the fire, and warn firefighter to leave an area where there is a fast approaching fire.

FIG. 2 shows a flying device 400 having the shape of a Rogollo wing. The struts 410 provide a framework for the fabric 420 of flying device 400 to keep its shape. The fabric 420 defines the envelope of a balloon to hold helium for lifting the flying device 400. The Rogollo wing type design helps the flying device 400 stay pointed into the wind and is a relatively stable platform for the SIRPS. The flying device 400 has a yoke 430 attached to the struts 410. The flying device 400 has a wind speed sensor and controller 480 which varies the attachment point on the yoke 430 to keep the flying device 400 straight and level. The yoke is connected to tethers 300 for securing the flying device 400 to the ground 320. The flying device 400 will therefore remain in approximately the same position providing an aerial view for the SIRPS 120 and a high vantage point for a data transmitter 162 and a communications repeater 160.

Winches 350 are used to play out, real in, and adjust the positions of the tethers 300 to control the position flying device 400.

The pod 100 contains the SIRPS optics 120 and a housing 110 containing electronics. The electronics comprise, the SIRPS electronics 180, the GPS 170, the IMU 150, the link connection 190, the data transmitter 162, the receiver 164 and the repeater 160. The pod 100 is attached to the flying device 400 by lines 460.

The flying device 400 and pod 100 can be transported to any location and deployed in minutes. The flying device 400 can be filled with helium contained in fabric 420 so it can be lofted even in a no wind situation. A helium supply tank 340 on the ground is used to initially fill the flying device 400 with helium. Helium fill line 360 can be attached to a tether cable 300 and connect the flying device 400 to the helium supply tank 340 to keep the flying device 400 filled over long periods of time.

The controller 480 can add helium to increase the lift of the flying device, or if the wind velocity increases, release helium.

A battery 370 or other source of power may be located on the ground 320 and a wire 380 attached to a tether cable 300 can provide power to the electronics in the pod 100.

The SIRPS optics 120 and SIRPS electronics 180 are described in U.S. Pat. No. 5,534,697 issued Jul. 9, 1996 and U.S. Pat. No. 5,502,309 issued Mar. 26, 1996. These patents are hereby made a part hereof and incorporated herein by reference. Further patent applications having Ser. No. 08/455,885 filed May 31, 1995, now U.S. Pat. No. 5,627,675 and Ser. No. 08/533,801 filed Sep. 26, 1996, now U.S. Pat. No. 5,841,589 also related to SIRPS are made a part hereof and incorporated herein by reference. The SIRPS unit for the fire fighting embodiment presented here is sensitive to infrared for spotting fires.

Figure 3:
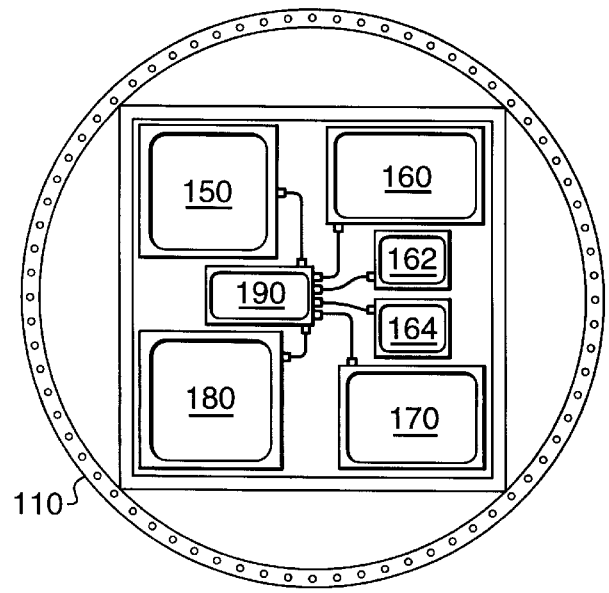
FIG. 3 shows the electronics inside of the pod.

The electronics in housing 110 is shown is FIG. 3. The SIRPS optics 120 provide a means of surveilling the area around flying device 400 and converting the scene into electronic data in the SIRPS electronics 180. A GPS receiver 170 (an off the shelf item such as those made by the Collins Division of Rockwell International Corporation) is used to provide the location of the pod 100, and with other data, the location of the objects the SIRPS optics 120 sees to the user.

SIRPS electronics 180 provides integration control and timing to the SIRPS focal plane and readout electronics. The SIRPS electronics 180 also does some of the initial preprocessing so that the bandwidth of the data link to the command post 500 is minimized. The command post 500 or the SIRPS electronics 180 aggregates scenes in different ways and gives different biases to the focal plane so that the scene that is presented to the user has the best possible signal to noise ratio.

The individual parts of the scene can be aggregated to build the level of the background above the sensor noise level. Regions of high intensity fire need less aggregation so as to not saturate displays. Therefore fires are displayed with locally shorter effective integration times. Scene differencing and remote sensor calibration are used to enhance change detection in both the fire condition and equipment locations.

The IMU 150 (Inertial Measurement Unit) is an off the self unit which also provides means to derive attitude data for the pod so that the command post knows how the SIRPS optics 120 are oriented. These data, with the GPS location data, give the user reliable locations of the objects in the images from the SIRPS optics 120. By using SIRPS optics 120, the attitude of the IMU 150, the GPS location data, and the vectors observed by the calibrated directions of the SIRPS pixels, as well as the x,y,z locations of the terrain features previously received, the GPS coordinates of the vector termination of an object can be established with high precision.

A data transmitter 162 sends the GPS, IMU and SIRPS signals from the link connection 190 to a display 550 in the command post 500 for the user to see where the fire is, how fast it is moving, and where it is located with respect to the fire fighters and equipment. The user may choose to plot the position of objects on maps to aid him in using the information.

A command receiver 164 is connected to the link connection 190 for receiving signals from the command post 500 and sending command signals for controlling the GPS 170, IMU 150, SIRPS optics 120, and SIRPS electronics 180 units.

The communications repeater 160 is an off the self item which receives and rebroadcasts voice and data signals to relay messages from fire fighters 700 on the ground to each other where the signal may be blocked by terrain from being directly communicated between the two parties. The communications repeater 160 also provides bidirectional messages between fire fighters 700 in the field and command post 500.

Link connection 190 connects the SIRPS electronics 180, the IMU 150, the GPS 170, and the communications repeater 160 to the power source, and to each other for each unit to communicate with the others. The Link connection 190 contains a multiplexer for connecting the GPS 170, IMIJ 150 and SIRPS electronics 180 data to the data transmitter 162 data link. The data from each source is given a previously programmed sequential order in the data stream. This sequence is detected and segregated upon receipt at the command post 500.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. Apparatus for observing objects and providing position data thereon comprising:

a staring infrared panoramic sensor (SIRPS), including optics for providing real-time observation of objects, and electronics for providing electronic data related to the observed objects;

an inertial measuring unit (IMU) for determining an orientation of the SIRPS;

a global positioning system (GPS) receiver for determining a position of the SIRPS;

a link connection, connected to the SIRPS, the IMU and the GPS receiver, for combining signals from the IMU, GPS receiver and the SIRPS; and a transmitter connected to the link connection to broadcast the signals from the IMU, GPS and SIRPS.

2. The apparatus of claim 1, and further comprising a communications repeater, connected to the link connection and adapted to enable communications between multiple users.

3. The apparatus of claim 1, and further comprising an elevation mechanism adapted to support the apparatus in an elevated position.

4. The apparatus of claim 3, wherein the elevation mechanism comprises a flying device.

5. The apparatus of claim 4, wherein the flying device is a tethered, inflatable device having a Rogollo wing shape including means for pointing the device windward to enhance stability of the apparatus.

6. The apparatus of claim 1, and further comprising a command receiver, connected to the SIRPS and adapted to receive command signals from a remote source to enable remote control of the SIRPS.

7. The apparatus of claim 1, and further comprising a display terminal, connected to the transmitter and adapted to display information regarding the objects observed by the optics.

8. The apparatus of claim 7, wherein the display terminal is adapted to display data relating to relative positions of the objects with respect to each other.

9. The apparatus of claim 8, wherein the display terminal is further adapted to display global positioning system coordinates of the objects.

10. A system for observing objects and providing positioning data thereon, the system comprising:

a housing;

a staring infrared panoramic sensor (SIRPS), including
optics for providing real-time observation of objects, and
electronics, enclosed in the housing and in communication with the optics for providing electronic data related to the observed objects;

an inertial measuring unit (IMU), enclosed in the housing, for determining orientation of the SIRPS;

a global positioning system (GPS) receiver, enclosed in the housing, for determining a position of the SIRPS;

a link connection, connected to the electronics, the IMU and the GPS receiver, for providing a communications link between the IMU, GPS receiver, and the SIRPS;

a transmitter connected to the link connection and adapted to broadcast signals from the IMU, GPS receiver and the SIRPS; and a radio repeater, connected to the link connection, to relay messages through the link connection to enable communications between multiple users.

11. The system of claim 10, and further comprising an elevation mechanism connected to the optics and adapted to support the optics in an elevated position to provide a better view of the objects and enhanced broadcasting of signals from the transmitter.

12. The system of claim 10, and further comprising a command receiver, connected to the electronics and adapted to receive command messages from a remote source to enable remote control of the electronics.

13. The system of claim 10, and further comprising an elevation mechanism adapted to support the optics in an elevated position for a better view of the objects and enhanced signal broadcasting from the transmitter.

14. The system of claim 13, wherein the elevation mechanism comprises a flying device.

15. The system of claim 14, wherein the flying device is a tethered, inflatable device having a Rogollo wing shape.

* * * * *